United States Patent [19]

Smith et al.

[11] Patent Number: 5,219,260

[45] Date of Patent: Jun. 15, 1993

[54] APPARATUS FOR TRANSFERRING A TRAILER BODY BETWEEN A TRAILER AND TRUCK BODY

[75] Inventors: Fred T. Smith; Fred P. Smith, both of Alpine, Utah

[73] Assignee: Redwood Reliance Sales Company, Cotati, Calif.

[21] Appl. No.: 874,533

[22] Filed: Apr. 27, 1992

Related U.S. Application Data

[63] Continuation of Ser. No. 614,613, Nov. 15, 1990, abandoned, which is a continuation of Ser. No. 306,449, Feb. 3, 1989, abandoned.

[51] Int. Cl.[5] .................................................. B60P 1/36
[52] U.S. Cl. ..................................... 414/345; 414/396; 414/401; 414/499
[58] Field of Search ............................. 414/340–345, 414/349–353, 492, 493, 499, 528, 395, 396, 392, 393, 398–401, 498; 198/465.1, 803.01, 748

[56] References Cited

U.S. PATENT DOCUMENTS

| 1,288,462 | 12/1918 | Alborn | 414/499 |
|---|---|---|---|
| 2,352,129 | 6/1944 | Shonnard | 414/499 X |
| 2,516,881 | 8/1950 | Jarvis | 414/499 |
| 2,849,129 | 8/1958 | Likens | 414/340 X |
| 3,181,714 | 5/1965 | Kappen | 414/499 X |
| 3,204,756 | 9/1965 | Lesch | 198/803.01 X |
| 3,214,045 | 10/1965 | Dempster et al. | 414/499 X |
| 3,802,588 | 4/1974 | Lutz | 414/499 X |
| 4,461,379 | 7/1984 | Papp | 198/465.1 |
| 4,543,026 | 9/1985 | Halonen et al. | 414/499 X |
| 4,655,667 | 4/1987 | Plumb et al. | 414/343 |
| 4,656,949 | 4/1987 | Ragot | 198/465.1 X |
| 4,690,611 | 9/1987 | Nobuhara | 198/748 X |
| 4,737,063 | 4/1988 | van den Pol | 414/345 X |

FOREIGN PATENT DOCUMENTS

414386 9/1910 France ................................. 414/499

Primary Examiner—David A. Bucci
Attorney, Agent, or Firm—Ellsworth R. Roston; Charles H. Schwartz

[57] ABSTRACT

A truck having a truck body is adapted to tow a trailer having a body disposed on a track. The truck body is tiltable to dump a load. A tailgate in the truck body is liftable after the load dumping. At its forward end, the trailer has a horn movable into mating holes in the truck after the dumping of the load from the truck body. A sprocket chain in a closed loop on the trailer track includes rollers which rotate on the track to move the trailer body in a direction into, and out of, the truck body. Pins in pairs of dog links extend through individual rollers to have the dog links move with the sprocket chains. Dogs on the dog links engage a hook coupled to the trailer body. The links are disposed so that the dogs on one link engages the hook to move the trailer body into the truck body and the dog on the other link engages the hook to move the trailer body out of the truck body. Actually, pairs of dog links may be provided to engage pairs of hooks, one pair of dog links being on one side of the sprockets (disposed laterally at a median position) and the other pair of dog links being on the other side of the sprockets. The sprockets may be driven by a hydraulic motor connected in a hydraulic circuit to provide a controlled downward movement of the trailer body when the truck and the trailer are on an incline. With the trailer body in the truck body, the truck and trailer bodies may be tilted to dump the load in the trailer body.

46 Claims, 3 Drawing Sheets

TRAILER   TRUCK

APPARATUS FOR TRANSFERRING A TRAILER BODY BETWEEN A TRAILER AND TRUCK BODY

This is a continuation of application Ser. No. 614,613 filed Nov. 15, 1990 (now abandoned), which in turn is a continuation of application Ser. No. 306,449 filed Feb. 3, 1989 (now abandoned).

This invention relates to apparatus including a dump truck and a trailer and move particularly relates to apparatus for facilitating the introduction of the trailer body into the truck body, after the dumping of the load in thr truck body, to provide for the dumping of the load in the trailer body.

Dump trucks have truck bodies which carry a load to be dumped. The payload may be dirt, rocks, topsoil or asphalt or a number of other materials. The dump trucks can be driven to any desired site and the truck bodies can then be tilted upwardly at their forward ends to provide for the dumping of the payload in the truck bodies at the desired site.

To increase the efficiency in the operation of the dump trucks, trailers are often coupled to the rear ends of the dump trucks. The trailers have bodies which are able to carry a load which is the same as, or different from, the load in the truck body. For example, the truck body may be carrying dirt and the trailer body may be carrying rocks. The load in the truck body may be dumped at a first site. The truck and the trailer may then be driven to a second site where the load in the trailer body may be dumped.

When it is desired to dump the load in the trailer body, a horn in the trailer body is moved into holes in the truck to couple the trailer and the truck to each other in a contiguous relationship. A sprocket on the trailer truck then moves the trailer body into the truck body. The truck can then be driven to the desired site for dumping the load in the trailer body and the load in the trailer body is then dumped at that site.

The apparatus now in use for transferring the trailer body into the truck body or for returning the trailer body to the trailer has certain disadvantages. One disadvantage is that the apparatus does not operate on a positive basis in transferring the trailer body between the trailer and the truck body. This sometimes makes it difficult for the apparatus now in use to provide such a transfer. Another disadvantage is that the apparatus now in use does not provide a balanced operation in making such a transfer. A further disadvantage is that the apparatus now in use is not able to move the trailer body very well into the truck body or back to the trailer when the trailer is on an incline.

The transferring operation now in use has been in existence for some time. During all of this time, the disadvantages in the use of such apparatus have been known. A considerable effort has been made, and significant amounts of money have been expended, to overcome the disadvantages of such apparatus. In spite of this, the problems with the use of such apparatus still persist.

This invention provides apparatus which overcomes the disadvantages of the apparatus of the prior art. The apparatus of this invention provides a positive transfer of a trailer body into a truck body from a track in the trailer body and then provides a positive transfer of the trailer body from the truck body to the trailer. The apparatus operates on a balanced basis to provide this transfer. The apparatus provides this positive transfer whether the truck and the trailer are horizontally level or on an incline.

In one embodiment of the invention, a truck having a body is adapted to tow a trailer having a body disposed on a track. The truck body is tiltable to dump a load. A tailgate in the truck body is liftable after the load dumping. At its forward end, the trailer has a horn movable into mating holes in the truck after the dumping of the load from the truck body.

A sprocket chain in a closed loop on the trailer track includes rollers which rotate on the track to move the trailer body in a direction into, and out of, the truck body. Pins in a pair of dog links extend through individual rollers to have the dog links move with the sprocket chains. Dogs on the dog links engage hook coupled to the trailer body. The links are disposed so that the dogs on one link engage the hook to move the trailer body into the truck body and the dog on the other link engages the hook to move the trailer body out of the truck body. Actually, pairs of dog links may be provided to engage pairs of hooks, one pair of dog links being on one side of the sprockets (disposed laterally at a median position) and the other pair being on the other side of the sprockets.

The sprockets may be driven by a hydraulic motor connected in a hydraulic circuit to provide a controlled downward movement of the trailer body when the truck and the trailer are on an incline. With the trailer body in the truck body, the truck and trailer bodies may be tilted to dump the load in the trailer body.

Figure 1:
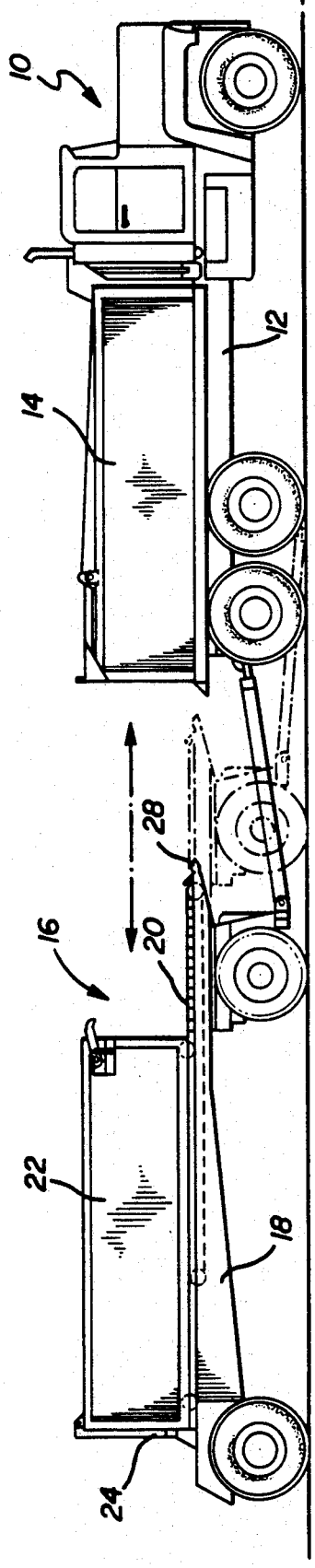
FIG. 1 is a side elevational view illustrating, in solid lines, a truck and truck body and a trailer and trailer body with the trailer coupled to the truck, in displaced relationship to the track, for towing by the truck and further illustrating, in broken lines, the trailer decoupled from the track and displaced toward the truck.

In one embodiment of the invention, a truck generally indicated at 10 is provided with a chassis 12 and a body 14. The body 14 is provided with walls to store a load which may comprise any one of a considerable number of different materials. For example, the load may comprise asphalt, rocks or topsoil. The chassis 12 and the body 14 may be constructed to provide for a tilting of the body 14 relative to the chassis 12 in a direction such that the forward end of the truck body is higher than the rear end of the truck body. In this way, the load in the truck body can be dumped at any desired site.

To increase the efficiency in the operation of the truck 10, a trailer generally indicated at 16 may be removably coupled to the rear end of the truck. The trailer 16 includes a chassis 18, a track 20 at the top of the chassis and a body 22 extending upwardly from the track. The body 22 may hold a load which may be the same as, or different from, the load in the truck body 14. For example, the load in the truck body 14 may be dirt and the payload in the trailer body 22 may be rocks. The load in the trailer body 22 may be dumped at a different site than the load in the truck body 14.

Figure 2:
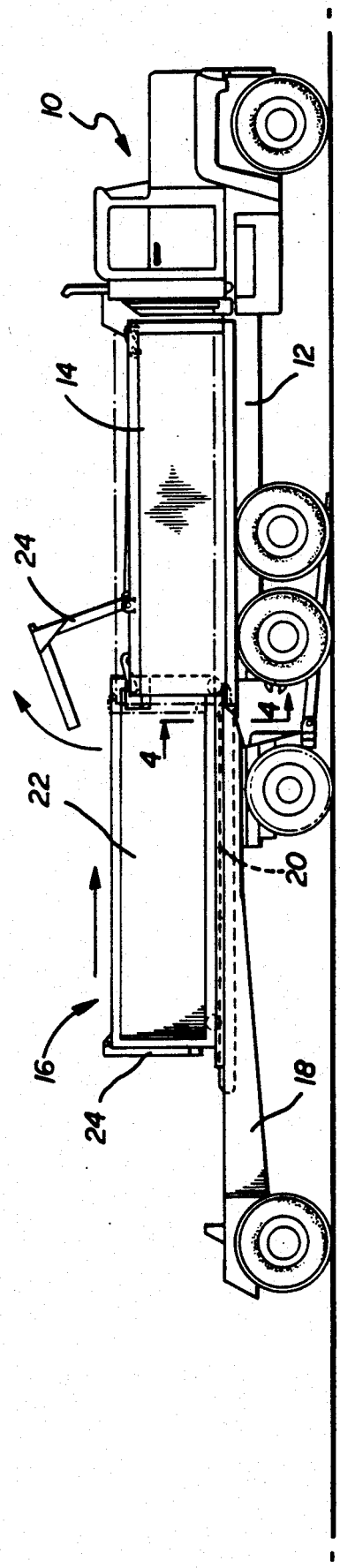
FIG. 2 is a side elevational view similar to FIG. 1 and illustrates the trailer coupled to the truck in abutting relationship to the truck.

The load in the trailer body 22 is dumped after the load in the truck body 14 has been dumped. As will be appreciated, there are no facilities on the trailer 16 for dumping the load in the trailer body 22. To provide for the dumping of the load in the trailer body 22, a tailgate 24 in the trailer body 22 is initially raised as indicated in FIG. 2. The truck 10 is then moved so that horns 28 (FIG. 3) at the forward end of the trailer track 20 become disposed in mating apertures 30 in the truck 10 to provide a contiguous relationship between the truck and the trailer. The truck may then be moved such that a bumper 30 at the rear end of the truck abuts a bumper 31 at the forward end of the trailer track 20. Since the trailer track 10 is now in contiguous relationship with the floor of the truck body, the trailer body 22 is now ready to be transferred into the truck body 14.

Figures 3, 4:
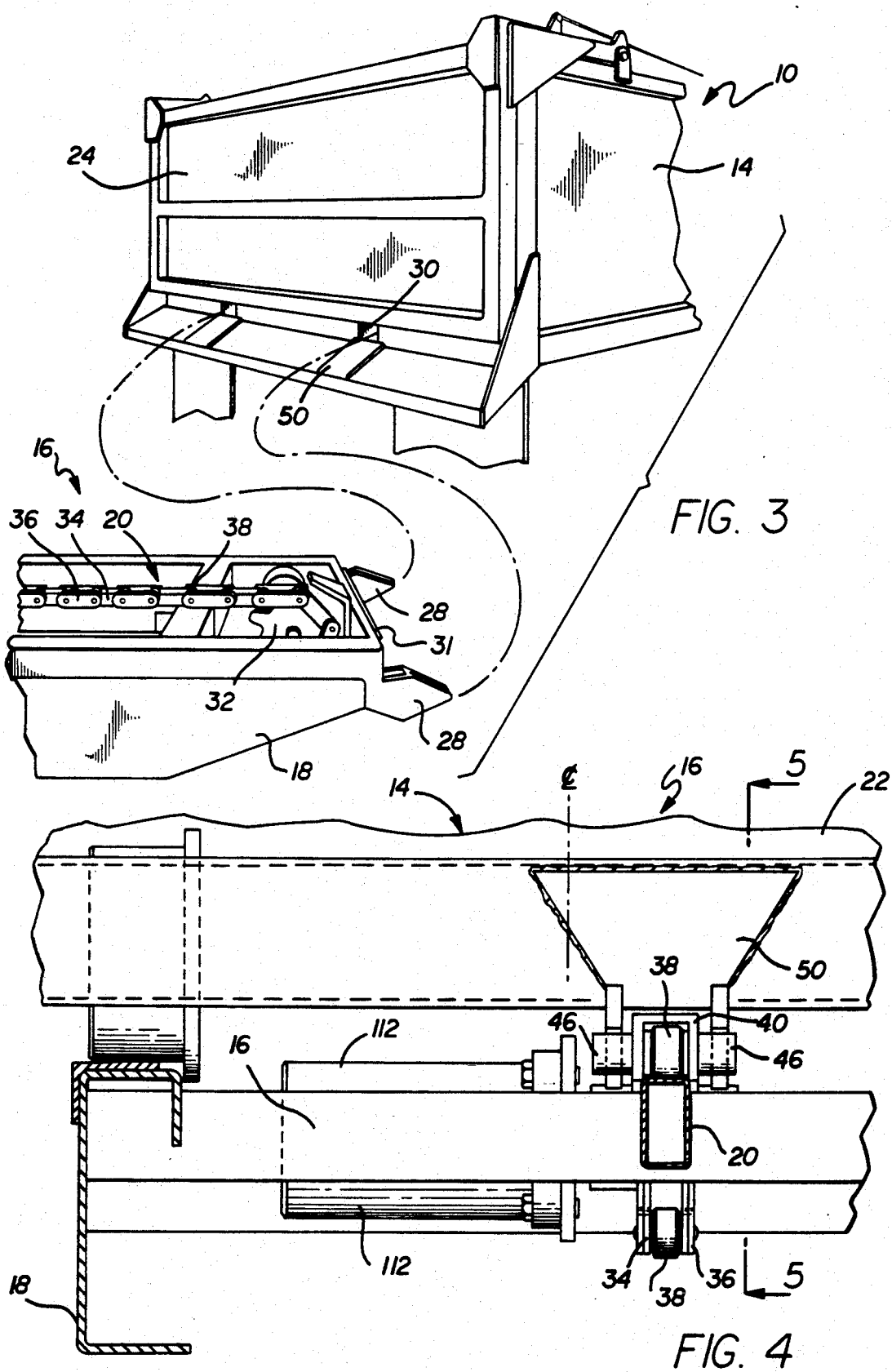
FIG. 3 is fragmentary exploded perspective view of the truck and the trailer and the members on the track and the trailer for providing a coupling of the truck and the trailer in abutting relationship.
FIG. 4 is a front elevational view of apparatus constituting one embodiment of this invention for moving a body on the trailer into, or out of, a body on the truck.
Figure 5:
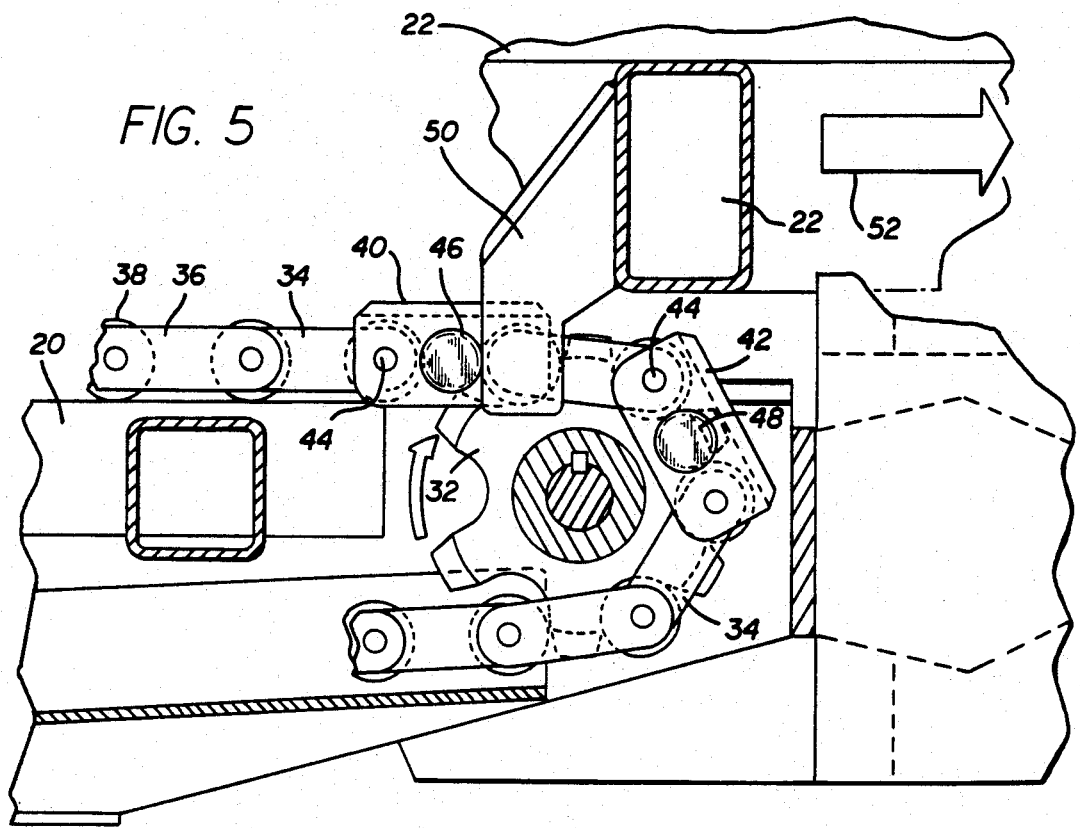
FIG. 5 is a sectional view taken substantially on the lines 5—5 of FIG. 4 and illustrates the apparatus of this invention in additional detail.

The transfer of the trailer body 22 into the truck body 14 is effectuated by one embodiment of the apparatus constituting this invention as shown in FIGS. 4 and 5. This embodiment includes a sprocket wheel 32 which is disposed on the trailer track 20 and which is adapted to drive a sprocket chain 34. The sprocket chain 34 may be disposed at an intermediate position between the lateral sides of the trailer 16. The sprocket chain includes links 36 and rollers 38 in a conventional manner, the rollers being disposed to roll on the trailer track 20 in accordance with the rotation of the sprocket wheel 32.

A pair of dog links 40 and 42 are suitably coupled by pins 44 to adjacent pairs of the rollers 38. The dog links 40 and 42 extend laterally from one side of the sprocket chain 34 and a similar pair of dog links extend laterally from the opposite side of the sprocket chain 38. Dogs 46 and 48 are respectively disposed at intermediate positions along the lengths of the dog links 40 and 42. As shown in FIGS. 4 and 5, the dogs 46 and 48 and the dog links are disposed in a plane common with the plane of the sprocket chain 34 when the dogs and the dog links are between the two opposite ends of the closed loop defined by the sprocket chain. Hooks 50 are disposed at their bottom ends to be engaged by the dogs 46 and 48 on the dog links 40 and 42. As shown in FIGS. 4 and 5, this engagement is in the plane defined by the portion of the sprocket chain 34 between the opposite ends of the closed lop defined by the sprocket chain. At their upper ends, the hooks 50 are suitably attached to the trailer body 22.

During the time that the sprocket wheel 32 is driven in a clockwise direction, the sprocket chain 34 is moved to the right in FIG. 5. At such a time, the dogs 46 on the dog links 40 engage the hooks 50 to move the trailer body 22 into the truck body 14. This movement continues until the forward wall in the trailer body 22 engages the forward wall in the truck body 14.

When it is desired to return the trailer body 22 from the truck body 14 to the trailer track 20, the sprocket wheel 32 is rotated in a counter clockwise direction. This causes the dogs 48 on the dog links 42 to engage the hooks 50. The dogs 48 then act to move the trailer body 22 onto the trailer track 20 as the sprocket chain 34 moves to the left in FIG. 5.

Figure 6:
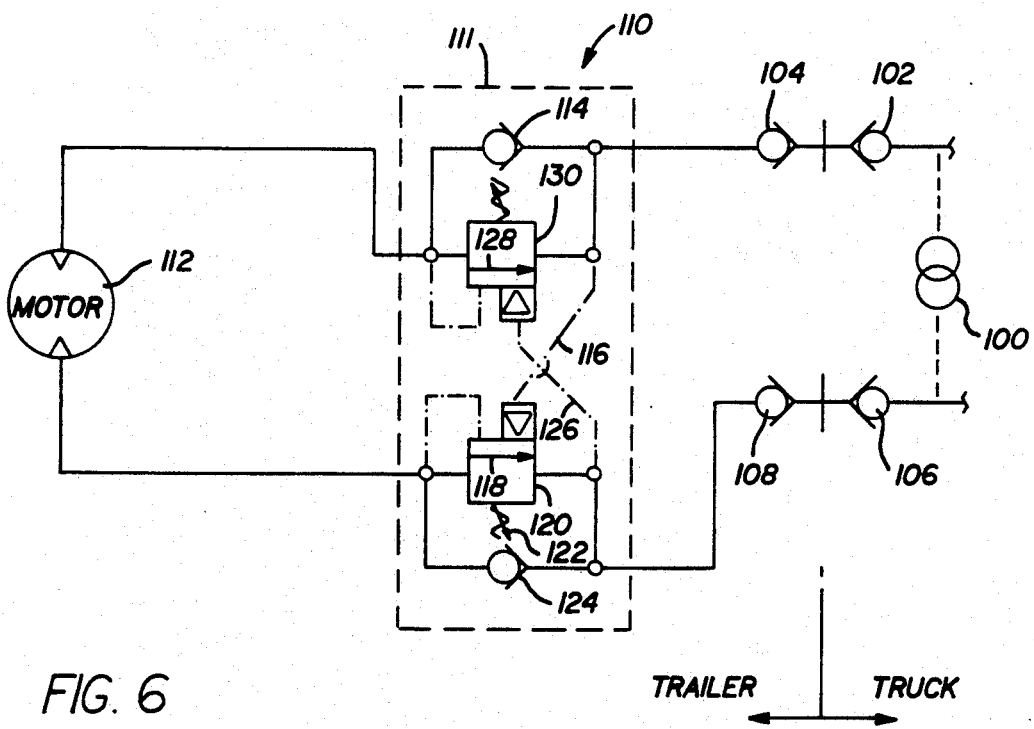
FIG. 6 illustrates a portion of a hydraulic circuit which operates in conjunction with the apparatus shown in FIGS. 3 and 4 to provide a controlled movement of the trailer body into, and out of, the truck body even when the trailer is on an incline.

The apparatus described above has certain important advantages. It provides for a positive and reliable transfer of the trailer body between a truck body 14 and a track 20 on the trailer 16. The apparatus is simple in construction even though it provides this positive and reliable transfer. The apparatus provides the movement of the trailer body relative to the truck body on a balanced basis. The apparatus is also able to provide such a transfer on a controlled basis even when the truck and the trailer are on an incline as will be now described in connection with the hydraulic circuit shown in FIG. 6.

The apparatus is further advantageous in that the hooks 50 are locked between the relatively closely spaced pair of dog links 40 to prevent the trailer body from moving horizontally, particularly when the motor for driving the sprocket wheel 32 is locked in position. Another advantage results from the fact that the dogs 46 and 48 are substantially aligned with the sprocket chain 34 in the direction of movement of the trailer body 22 into, and out of, the truck body 14. Because of this, no moment is imposed upon the sprocket chain 34 when the trailer body 22 is moved into, and out of, the truck body 14.

The hydraulic circuitry for controlling the operation of the apparatus described above is shown on a simplified basis in FIG. 6. The hydraulic circuitry includes a source 100 of hydraulic fluid.

The source 100 is connected at opposite ends to a first pair of check valves 102 and 104 and a second pair of check valves 106 and 108. The check valves 102 and 106 are disposed in the truck 10 and the valves 104 and 108 are disposed in the trailer 16. The check valves 102 and 104 pass fluid only when the trailer 16 is coupled to the truck 10. Similarly, the check valves 104 and 108 pas fluid only when the trailer 16 is coupled to the truck 10.

Fluid passing through the check valves are introduced to a valve assembly generally indicated at 110. The valve 110 is shown as being enclosed within broken lines 111. The fluid flowing through the valve assembly 110 is introduced to a hydraulic motor 112 to provide for a rotation of the sprocket wheel 32 in one of two (2) opposite directions.

When the truck 10 and the trailer 16 are on a horizontally level surface, fluid flows through the check valves 102 and 104 and a check valve 114 to the hydraulic motor 112 in a direction to move the trailer body 22 into the truck body 14. The pressure of this fluid is relatively great because of the force required to move the trailer body 22 into the truck body 14. This pressure acts through a line 116 (shown in broken form) to force a movable member 118 into alignment with input and output conduits in a valve 120 against the action of a spring 122. In this way, the hydraulic fluid is able to flow from the motor 112 through the valve 120 to complete the hydraulic circuit through the motor. The motor 112 accordingly operates to drive the sprocket wheel 32 in a direction for moving the trailer body 22 into the truck body 14.

In like manner, when it is desired to move the trailer body 22 from the truck body to the trailer track 20, hydraulic fluid flows through a check valve 124 to the motor 112. At the same time, the pressure of the fluid in a line 126 (shown in broken form) acts on a movable member 128 to position the member for the flow of fluid through a valve 130. The fluid accordingly flows through the motor 112 in a direction to produce a movement of the trailer body 22 from the truck body 14 to the trailer track 20.

It may sometimes happen that the truck 10 and the trailer 16 are on an incline. Under such circumstances, the trailer body 22 would tend to move on a somewhat uncontrolled basis downwardly in the direction of the incline when a movement of the trailer body is initiated in that direction. However, the valve assembly 110 acts to provide a controlled braking action on the trailer body 22 so that the movement of the trailer body is provided under some constraint or a regulated basis.

For example, when the truck 10 and the trailer 22 are on an incline so that the trailer is uphill of the truck, the pressure of the fluid flowing through the check valve 114 is relatively low. This low fluid pressure initially prevents the valve 120 from opening. Since the valve 120 is not open, the pressure of the fluid in the line 116 gradually increases until the member 118 moves to a position where the valve 120 partially opens. The partial opening of the valve 120 limits the rate of flow of fluid through the valve 120. This limited flow of fluid causes a partial braking action to be provided on the motor 112 to prevent the movement of the trailer body 22 in the downward direction from being unconstrained.

It will be appreciated that a modification of the invention can be provided without departing from the scope of the invention. In this modification, a pair of dog links may be centrally disposed and a pair of sprocket chains may be provided to obtain a balanced operation. One sprocket chain may be disposed on one side of the dog links in coupled relationship to the dog links and the other sprocket chain may be disposed on the other side of the dog links in coupled relationship to the dog links.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for transferring a first body into and out of a second body, the first body being constructed to be disposed on a particular apparatus having a track,
a rotatable sprocket wheel,
means for rotating the sprocket wheel,
a sprocket chain disposed on the track of the particular apparatus and movable in a closed loop and having sprockets for engaging the sprocket wheel for movement in accordance with the rotation of the sprocket wheel, the sprocket chain being disposed in a plane between ends of the closed loop,
a pair of dog links disposed on successive pairs of the sprockets for movement with the sprockets, the dog links being in the plane of the sprocket chain in a portion of the sprocket chain between the opposite ends of the closed loop defined by the sprocket chain,
a dog disposed on each of the dog links in the plane of the sprocket chain between opposite ends of the closed loop defined by the chain, and
a hook attachable to a rear end of the first body and disposed relative to the dogs on the dog links to be engaged by one of the dogs in the plane of the sprocket chain for moving the first body from the track on the particular apparatus into the second body and to be engaged by the other dog in the plane of the sprocket chain for moving the first body from the second body to the track on the particular apparatus.

2. In a combination as set forth in claim 1,
a second pair of dog links spaced laterally from the first pair of dog links and having a construction corresponding to the first pair of dog links, the dog links in the second pair being in the plane of the sprocket chain between the opposite ends of the closed loop defined by the sprocket chain, and
a second pair of dogs spaced laterally from the first pair of dogs, each of the second dogs being disposed on an individual one of the dog links in the second pair in the plane of the sprocket chain and having a construction corresponding to that of the first pair of dogs, and
a second hook spaced laterally from the first hook and attachable to the rear end of the first body and having a construction corresponding to that of the first hook and constructed to be engaged by one of the dogs in the second pair in the plane of the sprocket chain for moving the first body from the track on the particular apparatus into the second body and to be engaged by the other one of the dogs in the second pair for moving the first body from the second body to the track on the particular apparatus.

3. In a combination as set forth in claim 1,
means for providing a controlled movement of the hook and the first body between the second body and the particular apparatus with the particular apparatus on an incline.

4. In a combination as recited in claim 2 wherein
the sprocket and the sprocket chain are positioned at an intermediate position between lateral sides of the first track and the dogs in the first and second pairs and the first and second hooks are respectively disposed on opposite sides of the sprocket and the sprocket chain.

5. In a combination as recited in claim 4 wherein
the driving means for the sprocket is hydraulic and
means are connected in a hydraulic circuit with the hydraulic driving means for providing a controlled braking action on the hydraulic driving means during movement of the first body downwardly with the particular apparatus on an incline.

6. In a combination as set forth in claim 1,
the dog being in the particular plane with the sprocket chain in the direction of moving the body on the first apparatus between the second body and the track on the particular apparatus.

7. In combination for transferring a first body into, and out of, a second body, the first body being disposed on a particular apparatus having a track,
driving means,
means driven by the driving means for movement of such driven means on the track on the particular apparatus in a plane to provide for movement of the first body on the track on the particular apparatus in a first direction from the particular apparatus into the second body and to provide for movement of the first body in an opposite direction from the second body into the track on the particular apparatus, hook means attached to the first body for moving the first body in the first direction and in the opposite direction, coupling means including dog links disposed on the driven means in a plane of the driven means at positions on the driven means for driving the first body in the first and opposite directions in accordance with the movement of the driven means on the track on the particular apparatus, and means including dogs disposed on the coupling means in the plane of the driven means for engaging the hook means in the plane of the driven means to driven the hook means and the first body in the first and opposite directions.

8. In a combination as set forth in claim 7 wherein the driving means are hydraulic and means are included in a hydraulic circuit with the hydraulic driving means for providing a controlled movement of the first body relative to the track on the particular apparatus and the second body downwardly in one of the first and opposite directions when the particular apparatus is on an incline.

9. In a combination as recited in claim 7 wherein the driving means and the driven means are disposed at an intermediate position between opposite lateral sides of the first body, and the hook means, the coupling means and the engaging means are disposed on opposite lateral sides of the driving means and the driven means to provide a balanced movement of the first body in the first and opposite directions.

10. In a combination as recited in claim 9 wherein means are included in the track on the particular apparatus for engaging the second body to couple the track on the particular apparatus to the second body before the operation of the driving means in driving the first body in the first and opposite directions relative to the second body.

11. In a combination as recited in claim 10 wherein the driving means is hydraulic and means are included in a hydraulic circuit with the hydraulic driving means for operation, with the particular apparatus on an incline, in providing a controlled braking action on the first body during movement of the first body downwardly in the first and opposite directions to limit the speed of movement of the first body downwardly on the incline.

12. In a combination as set forth in claim 7,
the driving means and the coupling means being in the particular plane in the direction of movement of the first body between the second body and the track on the particular apparatus.

13. In combination for transferring a first body into, and out of, a second body, the first body being disposed on a particular apparatus, a track on the particular apparatus, the track having a horn, the track having a flat surface at its upper end, the second body having a hole for receiving the horn to couple the particular apparatus and the second body, rollers disposed on the track for rolling on the track, a sprocket chain including the rollers for movement relative to the track in a direction toward, and away from, the second body, the sprocket chain including the rollers being disposed in a particular plane and being movable in the particular plane, means for driving the sprocket chain in the direction toward, and away from, the second body, a hook coupled to the first body and extending to the particular plane for moving the first body in accordance with movements of the hook, and means coupled to the hook and disposed in the particular plane with the sprocket chain and movable with the sprocket chain for engaging the hook in the particular plane to move the hook and the first body in the direction toward, and away from, the second body.

14. In a combination as set forth in claim 13,
the moving means for the hook including a pair of dog links disposed on the sprocket chain in the particular plane with the sprocket chain, one of the dog links being disposed to engage the hook in the particular plane for moving the hook and the first body toward the second body and the other dog link being disposed to engage the hook in the particular plane for moving the hook and the first body away from the second body.

15. In a combination as set forth in claim 13,
means for providing for a controlled movement of the first body relative to the second body in a downhill direction when the particular apparatus is on an incline.

16. In a combination as set forth in claim 15,
the sprocket, the driving means and the rollers being disposed at an intermediate position between sides of the track on the particular apparatus and there being pairs of hooks and pairs of moving means spaced laterally from the sprocket and the rollers on opposite sides of the sprocket and the rollers and in the particular plane with the sprocket chain for providing a balanced movement of the first body in the directions into, and out of, the second body.

17. In a combination as set forth in claim 16,
the moving means including a pair of dog links disposed in the particular plane with the sprocket chain and having pins extending through individual ones of the rollers to couple the dog links to the sprocket chain for movement with the sprocket chain, the dog links having dogs disposed on the dog links in the particular plane with the sprocket chain, one of the dog links being disposed to have the dog on such dog link move the hook in the particular plane in a direction to dispose the first body in the second body and the other dog link being disposed to have the dog on such dog link move the hook in the particular plane in a direction to dispose the first body on the track on the particular apparatus.

18. In a combination as recited in claim 13,
the sprocket chain and the means coupled to the hook being in the particular plane in the direction of movement of the body on the particular apparatus into, and out of, the second body.

19. In combination,
first apparatus having a body,
second apparatus having a track and a body disposed on the track,
detent means disposed on the first apparatus and the second apparatus for cooperative engagement to retain the first apparatus and the second apparatus in abutting relationship,
dog links on the track on the second apparatus, means for driving the dog links in opposite directions along the track on the second apparatus, the dog links being disposed in a particular plane with the driving means, hooks disposed on the track on the second apparatus in a cooperative relationship with the body on the second apparatus and extending in the particular plane for moving the body on the second apparatus in one direction from the track on the second apparatus into the body on the first apparatus and for moving the body on the second apparatus in the opposite direction from the body on the first apparatus to the track on the second apparatus, and means disposed on the dog links in the particular plane with the driving means for engaging the hooks to move the hooks in the one and opposite directions.

20. In a combination as set forth in claim 19, the driving means for the dog links including means disposed at spaced intervals in the particular plane for cooperative relationship with the track on the second apparatus to provide a movement of the dog links along the track on the second apparatus, the dog links being disposed in adjacent relationship relative to the spaced means in the particular plane to provide for an engagement of the hook means in the particular plane by the dog on one of the dog links to drive the hook means in the one direction and to provide for an engagement of the hook means in the particular plane by the dog on the other dog link to drive the hook means in the opposite direction.

21. In a combination as set forth in claim 20, the driving means including a sprocket wheel and the spaced means including sprockets disposed for engagement by the sprocket wheel.

22. In a combination as set forth in claim 21, means for providing a controlled movement of the body on the second apparatus into, and out of, the body on the first apparatus when the second apparatus is on an incline.

23. In a combination as recited in claim 20, the driving means and the dog links being in the particular plane in the direction of movement of the body on the second apparatus between the track on the second apparatus and the body on the first apparatus.

24. In combination for transferring trailer body into and out of a truck body, the trailer body being constructed to be disposed on a trailer having a track, a rotatable sprocket wheel, means for rotating the sprocket wheel, a sprocket chain disposed on the track of the trailer and movable in a closed loop and having sprockets for engaging the sprocket wheel for movement in accordance with rotation of the sprocket wheel, the sprocket chain being disposed in a plane between ends of the closed loop, a pair of dog links disposed on progressive pairs of the sprocket chains for movement with the sprocket chains, the dog links being in the plane of the sprocket chain in a portion of the sprocket chain between the ends of the closed loop defined by the sprocket chain, a dog disposed on each of the dog links in the plane of the sprocket chain between opposite ends of the closed loop defined by the sprocket chain, and a hook attachable to a rear end of the trailer body and disposed relative to the dogs on the dog links to be engaged by one of the dogs in the plane of the sprocket chain for moving the trailer body from the trailer track into the truck body and to be engaged by the other dog in the plane of the sprocket chain for moving the trailer body from the truck body to the trailer track.

25. In a combination as set forth in claim 24, a second pair of dog links spaced laterally from the first pair of dog links and having a construction corresponding to the first pair of dog links, the dog links in the second pair being in the plane of the sprocket chain between the opposite ends of the closed loop defined by the sprocket chain, and a second pair of dogs spaced laterally from the first pair of dogs, each of the second dogs being disposed on an individual one of the dog links in the second pair in the plane of the sprocket chain and having a construction corresponding to that of the first pair of dogs, and a second hook spaced laterally from the first hook and attachable to the rear end of the trailer body and having a construction corresponding to that of the first hook and constructed to be engaged by one of the dogs in the second pair in the plane of the sprocket chain for moving the trailer body from the trailer track into the truck body and to be engaged by the other one of the dogs in the second pair in the plane of the sprocket chain for moving the trailer body from the truck body to the trailer track.

26. In a combination as set forth in claim 24, means for providing a controlled movement of the hook and the trailer body between the truck body and the trailer with the trailer on an incline.

27. In a combination as recited in claim 25 wherein the sprocket and the sprocket chain are positioned at an intermediate position between lateral sides of the trailer track and the dogs in the first and second pairs and the first and second hooks are respectively disposed on opposite sides of the sprocket and the sprocket chain.

28. In a combination as recited in claim 27 wherein the driving means for the sprocket is hydraulic and means are connected in a hydraulic circuit with the hydraulic driving means for providing a controlled braking action on the hydraulic driving means during movement of the trailer body downwardly with the trailer on an incline.

29. In a combination as set forth in claim 24, the dog being in the particular plane with the sprocket chain in a direction of moving the trailer body between the truck body and the tack on the trailer.

30. In combination for transferring a trailer body into, and out of, a truck body, the trailer body being disposed on a trailer having a track, driving means, means driven by the driving means for movement of such driven means on the trailer track in a plane to provide for movement of the trailer body on the trailer track in a first direction from the trailer into the truck body and to provide for the movement of the trailer body in an opposite direction from the truck body onto the trailer track, hook means attached to the trailer body for moving the trailer body in the first direction and in the opposite direction, coupling means including dog links disposed on the driven means in the plane of the driven means at positions on the driven means for driving the trailer body in the first and opposite directions in accordance with the movement of the driven means on the trailer track, and means including dogs disposed on the coupling means in the plane of the driven means for engaging the hook means to drive the hook means and the trailer body in the first and opposite directions.

31. In a combination as set forth in claim 30 wherein the driving means are hydraulic and means are included in a hydraulic circuit with the hydraulic driving means for providing a controlled movement of the trailer body relative to the trailer track and the truck body downwardly in one of the first and opposite directions when the trailer are on an incline.

32. In a combination as recited in claim 30 wherein the driving means and the driven means are disposed at an intermediate position between opposite sides of the trailer body, and the hook means, the coupling means and the engaging means are disposed on opposite sides of the driving means and the driven means to provide a balanced movement of the trailer body in the first and opposite directions.

33. In a combination as recited in claim 32 wherein means are included in the trailer track for engaging the truck body to couple the trailer track to the truck body before operation of the driving means in driving the trailer body in the first and opposite directions relative to the truck body.

34. In a combination as recited in claim 33 wherein the driving means is hydraulic and means are included in a hydraulic circuit with the hydraulic driving means for operation, with the trailer on an incline, in providing a controlled braking action on the trailer body during movement of the trailer body downwardly in the first and opposite directions to limit the speed of movement of the trailer body downwardly on the incline.

35. In a combination as set forth in claim 30, the driving means and the coupling means being in the particular plane in the direction of movement of the trailer body between the truck body and the track on the trailer.

36. In combination for transferring a trailer body into, and out of, a truck body, the trailer body being disposed on a trailer, a track on the trailer, the track having a horn, the track having a flat surface at its upper end, the truck body having a hole for receiving the horn to couple the trailer and the truck body, rollers disposed on the track for rolling on the track, a sprocket chain including the rollers for movement relative to the track in a direction toward, and away from, the truck body, the sprocket chain including the rollers being disposed in a particular plane and being movable in the particular plane, means for driving the sprocket chain in the direction toward, and away from, the truck body, a hook coupled to the trailer body and disposed in the particular plane for moving the trailer body in accordance with the movements of the hook, and means coupled to the hook and disposed in the particular plane with the sprocket chain and movable with the sprocket chain for engaging the hook in the particular plane to move the hook and the trailer body in the directions toward, and away from, the truck body.

37. In a combination as set forth in claim 36, the moving means for the hook including a pair of dog links disposed on the sprocket chain in the particular plane with the sprocket chain, one of he dog links being disposed to engage the hook in the particular plane for moving the hook and the trailer body toward the truck body and the other dog link being disposed to engage the hook in the particular plane for moving the hook and the trailer body away from the truck body.

38. In a combination as set forth in claim 36, means for providing for a controlled movement of the trailer body relative to the truck body in a downhill direction when the trailer is on an incline.

39. In a combination as set forth in claim 38, the sprocket, the driving means and the rollers being disposed at an intermediate position between sides of the trailer track and there being pairs of hooks and pairs of moving means spaced laterally from the sprocket and the rollers on opposite sides of the sprocket and the rollers and in the particular plane with the sprocket chain for providing a balanced movement of the trailer body in the directions into, and out of, the truck body.

40. In a combination as set forth in claim 39, the moving means including a pair of dog links disposed in the particular plane with the sprocket chain and having pins extending through individual ones of the rollers to couple the dog links to the sprocket chain for movement with the sprocket chain, the dog links having dogs disposed on the dog links in the particular plane with the sprocket chain for engaging the hook, one of the dog links being disposed to have the dog on such dog link move the hook in the particular plane in a direction to dispose the trailer body in the truck body and the other dog link being disposed to have the dog on such dog link move the hook in the particular plane in a direction to dispose the trailer body on the trailer track.

41. In a combination as recited in claim 36, the sprocket chain and the means coupled to the hook being in the particular plane in the direction of movement of the trailer body into, and out of, the truck body.

42. In combination, a truck having a truck body, a trailer having a track and a body disposed on the track, detent means disposed on the truck body and the trailer body for cooperative engagement to retain the truck body and the trailer body in abutting relationship, dog links on the trailer track, means for driving the dog links in opposite directions along the trailer track, the dog links being disposed in a particular plane with the driving means, hooks disposed on the trailer track in cooperative relationship with the trailer body and disposed in the particular plane for moving the trailer body in one direction from the trailer track into the truck body and for moving the trailer body in an opposite direction from the truck body to the trailer track, and means disposed on the dog links in the particular plane with the driving means for engaging the hooks to move the hooks in the one and opposite directions.

43. In a combination as set forth in claim 42, the driving means for the dog links including means disposed at spaced intervals in the particular plane for cooperative relationship with the trailer track to provide a movement of the dog links along the trailer track, the dog links being disposed in adjacent relationship relative to the spaced means in the particular plane to provide for an engagement of the hook means in the particular plane by the dog on one of the dog links to drive the hook means in the one direction and to provide for an engagement of the hook means by the dog in the particular plane on the other dog link to drive the hook means in the opposite direction.

44. In a combination as set forth in claim 43, the driving means including a sprocket wheel and the spaced means including sprockets disposed for engagement by the sprocket wheel.

45. In a combination as set forth in claim 44, means for providing a controlled movement of the trailer body into, and out of, the truck body when the trailer body is on an incline.

46. In a combination as recited in claim 42, the driving means and the dog links being in the particular plane in the direction of movement of the trailer body between the trailer track and the truck body.

* * * * *